United States Patent [19]

Kahara et al.

[11] 4,297,231

[45] Oct. 27, 1981

[54] PROCESS FOR PRODUCING A POSITIVE ELECTRODE FOR A NON-AQUEOUS ELECTROLYTIC CELL

[75] Inventors: Toshiki Kahara; Kohki Tamura; Noboru Ebata; Fumio Sato; Tomio Yoshida, all of Ibaraki, Japan

[73] Assignees: Hitachi, Ltd.; Hitachi Chemical Co., Ltd., both of Tokyo, Japan

[21] Appl. No.: 107,926

[22] Filed: Dec. 28, 1979

[30] Foreign Application Priority Data

Jan. 6, 1979 [JP] Japan ..................................... 54-865

[51] Int. Cl.$^3$ ....................... H01M 4/50; H01M 4/04
[52] U.S. Cl. ................................. 252/182.1; 252/521; 264/63; 264/104; 264/105; 423/599; 423/605; 429/217; 429/224; 429/232
[58] Field of Search .......................... 252/182.1, 521; 429/217, 224, 232; 106/56; 264/63, 104, 105; 423/599, 605

[56] References Cited

U.S. PATENT DOCUMENTS

| | | | |
|---|---|---|---|
| 4,133,856 | 1/1979 | Ikeda et al. | 429/224 |
| 4,163,811 | 8/1979 | Kohlmayr | 252/182.1 |
| 4,177,157 | 12/1979 | Adams | 252/182.1 |
| 4,216,045 | 8/1980 | Morioka | 252/182.1 |
| 4,216,279 | 8/1980 | Mellors | 252/182.1 |

*Primary Examiner*—Benjamin R. Padgett
*Assistant Examiner*—Irwin Gluck
*Attorney, Agent, or Firm*—Craig and Antonelli

[57] ABSTRACT

Disclosed is a process for producing a positive electrode for a non-aqueous electrolytic cell. Manganese dioxide is heat-treated at a temperature between 250° and 400° C. The heat-treated manganese dioxide is next mixed with a conducting agent and binder. The binder is suspended in water by means of non-ionic surface active agent, and the mixture is heat-treated at a temperature between 180° and 350° C. and then pressured molded into a positive electrode. This production process allows the provision of a positive electrode for a non-aqueous electrolytic cell of excellent discharge characteristics.

9 Claims, 10 Drawing Figures

PROCESS FOR PRODUCING A POSITIVE ELECTRODE FOR A NON-AQUEOUS ELECTROLYTIC CELL

BACKGROUND OF THE INVENTION

The present invention relates to a process for producing a positive electrode for a non-aqueous electrolytic cell or battery in which manganese dioxide is employed as the active material for the positive electrode (cathode), a light metal such as lithium or sodium is employed as the active material for the negative electrode (anode), and an organic electrolytic substance is employed as the electrolyte.

It has been already proposed to employ manganese dioxide as the active material for the positive electrode in a non-aqueous electrolyte cell.

In general, since manganese dioxide contains a large amount of combined water in addition to adherent water, water contained in manganese dioxide tends to oxidize or otherwise adversely affects the active material for the negative electrode such as lithium if manganese dioxide is employed as the positive electrode of such a cell. Therefore, it has been proposed to heat-treat manganese dioxide at a temperature within the range of 250°–350° C., and further at a temperature range of 350°–430° C., in order to remove water contained in manganese dioxide.

On the other hand, in preparation of a positive electrode of a cell using manganese dioxide as the active material, it is a common practice to add a conducting agent such as carbon powder, since the conductivity of the manganese dioxide itself is low and a binder for increasing the binding force between the manganese dioxide powders and the powders of the conducting agent, these two agents being mixed together in the ambient atmosphere.

Thus, there arises a problem that manganese dioxide is combined or adhered with water again while it is mixed with the conducting agent and/or the binder in the ambient atmosphere even if use is made of manganese dioxide which has been heat-treated for removal of the contained water, thereby making it meaningless to heat-treat the manganese dioxide.

In order to solve this problem, a method has been proposed including the steps of heat-treating manganese dioxide at a temperature ranging from 350° to 430° C., adding a conducting agent and a binder to be mixed together followed by molding, and then heat-treating the thus molded body at a temperature of from 200° to 350° C. (see U.S. Pat. No. 4,133,856).

However, in this prior art method, manganese dioxide is firstly added with a conducting agent and a binder to be admixed together and molded, and the thus formed molded body is subjected to heat treatment, so that water confined in the molded body in the admixing step will not be completely removed by heating which is applied after the molding step. This presents another problem wherein the discharge property, and in turn the storage property of the product, are adversely affected. In addition, a further new problem arises in that since the molded body or article is surrounded and retained by a metal ring, the molded article is deflected by heating due to the difference in thermal expansion coefficients of the metal ring and the molded article. Furthermore, not only is a special heating space required for heating the molded articles since the finished molded articles are subjected to heating, but the heating process also becomes complicated to render the method unfit for application to mass production. Yet a further problem is that the molded article must be handled most carefully to prevent damage during the heating step since the molded article per se is thin and is retained only by the surrounding retention ring, resulting in difficulties in handling and mass production.

SUMMARY OF THE INVENTION

An object of the present invention is to provide a process for producing a positive electrode for a non-aqueous electrolytic cell wherein the discharge properties of the cell can be improved.

Another object of the present invention is to provide a positive electrode for a non-aqueous electrolytic cell wherein the storage property of the cell can be improved. A further object of the present invention is to provide a process for producing a positive electrode for a non-aqueous electrolytic cell well suited for mass production.

A still further object of the present invention is to provide a process for producing a positive electrode for a non-aqueous electrolytic cell which can be easily handled.

Yet a further object of the present invention is to provide a process for producing a positive electrode for a non-aqueous electrolytic cell wherein deflection or deformation by heating is prevented.

The above objects of the invention are accomplished by mixing together a conductive agent, a binder and manganese dioxide, firstly heat-treating the mixture and then molding the thus heat-treated mixture. The above objects may be more easily accomplished by preliminarily subjecting the manganese dioxide to heat treatment prior to mixing.

Specifically in the present invention the mixture including a conductive agent, a binder and manganese dioxide is subjected to heat treatment prior to molding to form positive electrodes, so that water contained originally in the manganese dioxide and water adhering during the step of mixing with the conductive agent and the binder are removed concurrently. As a result, the improvements in discharge property and storage property can be attained.

Moreover, according to the invention, since the mixture is heated prior to molding, it is possible to preclude deflection or deformation of the molded articles otherwise caused in the conventional process due to the difference in thermal expansion coefficients of the molded articles and the retention or support eembers. No special heating space is required and the heating step can be simplified when compared with the case where the molded articles are heated, since the molding powder is heated in the form of a powder mixture. The fact that the heating is effected prior to molding facilitates handling in the heating step so that the cells can be applied to mass production.

The objects, features and effects of the present invention other than those mentioned hereinabove will be more clearly understood from the following description given with reference to the appended drawings.

DETAILED DESCRIPTION OF THE PREFERRED EMBODIMENTS

In an embodiment of the process for producing an electrode according to the invention, manganese dioxide employed as the active material for a non-aqueous cell is preliminarily subjected to a heat treatment. In order to obtain the optimum temperature at this preliminary heat treatment, fractions of manganese dioxide were separately heat-treated for 3 hours respectively at eight different temperatures of 200° C., 250° C., 300° C., 350° C., 375° C., 400° C., 425° C. and 450° C. Then, each of the fractions of manganese dioxide thus heat-treated at respective temperatures was added with acethylene black as a conducting agent and with a fine powder of polytetrafluoroethylene as a binder at a mixing ratio by weight of 10:0.7:0.5, and these were mixed together. Meanwhile, the fine powders of polytetrafluoroethylene used as the binder have particle sizes of 0.05–0.5 micron and tend to coagulate with each other to form larger size clods to lose their satisfactory functions as the binder when used immediately without any treatment. To obviate this phenomenon, the binder poweder will be used in the form of a suspension in a dispersing medium such as water by means of a suitable dispersing agent, for example, by using a non-ionic surface active agent such as polyoxyethylene alkylphenyl ether.

In order to obtain the optimum heat treatment temperature, the thus obtained eight mixtures were heat-treated at 150° C., 180° C., 220° C., 250° C., 300° C., 350° C. and 400° C. respectively for one hour. Thereafter, a quantity of each mixture corresponding to the amount of manganese dioxide having an electric capacity of 150 mAh was divided and pressure molded into a disc of 15 mm in diameter and about 1 mm in thickness to obtain a positive electrode. The preferred pressure applied at the pressure molding step was found to be 1,000–3,000 kg/cm$^2$.

A negative electrode constituting the other electrode of a non-aqueous cell may be produced in accordance with the conventional method employing lithium as the active material for the negative electrode.

The non-aqueous electrolyte substance interposed between the negative electrode and the positive electrode according to the invention is composed of a polypropylene non-woven cloth impregnated with a non-aqueous organic electrolyte prepared by dissolving lithium perchlorate at a concentration of 1 mol/l in a mixed solvent of propylene carbonate and 1,2-dimethoxyethane.

The changes in cell voltage with the lapse of time of the thus produced 56 cells, when discharged by connecting to a constant resistance of 3 kΩ, are shown in FIGS. 1 to 8.

Figure 1:
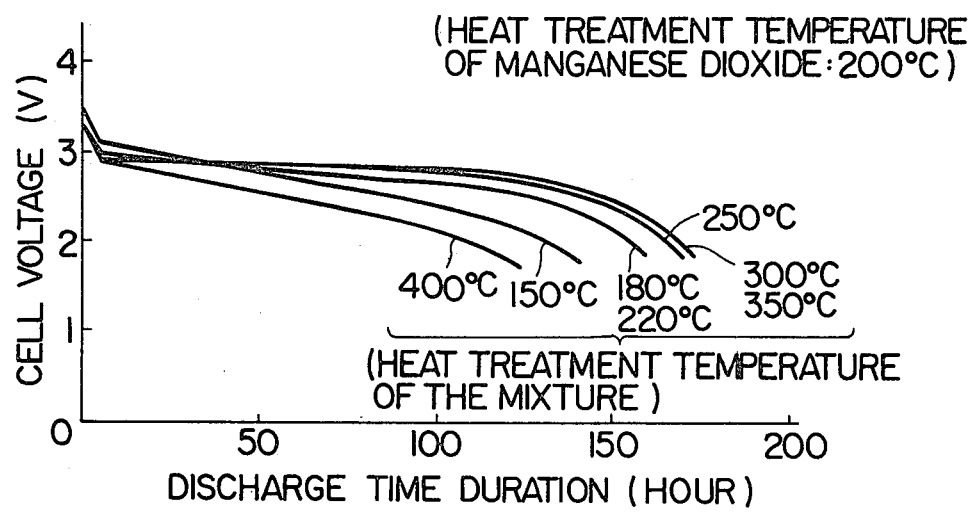
FIGS. 1 to 8 illustrate graphs showing the discharge properties of the cells in terms of the heat treatment temperatures of the mixture composed of manganese dioxide, a conductive agent and a binder wherein the heat treatment temperatures of manganese dioxide to be used as the active materials for non-aqueous electrolyte cells are 200° C., 250° C., 300° C., 350° C., 375° C., 400° C., 425° C., and 450° C., respectively.
Figure 2:
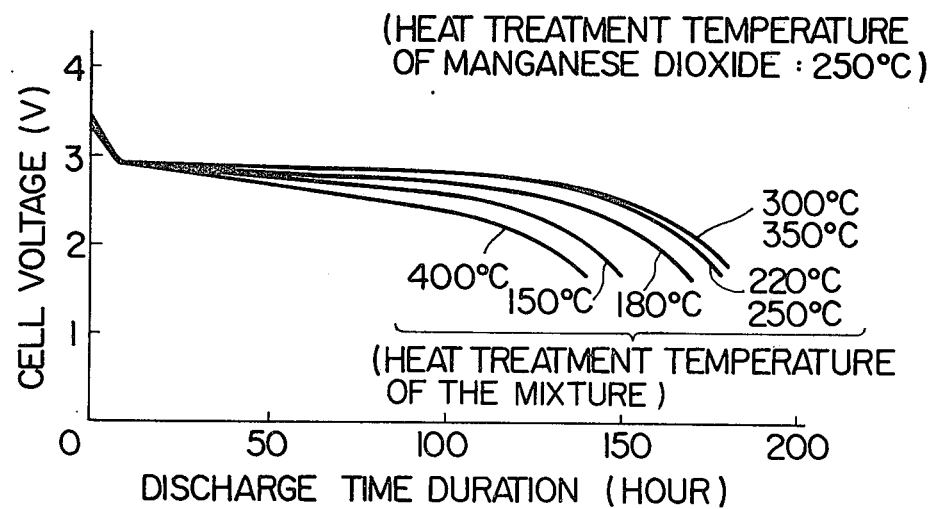
Figure 3:
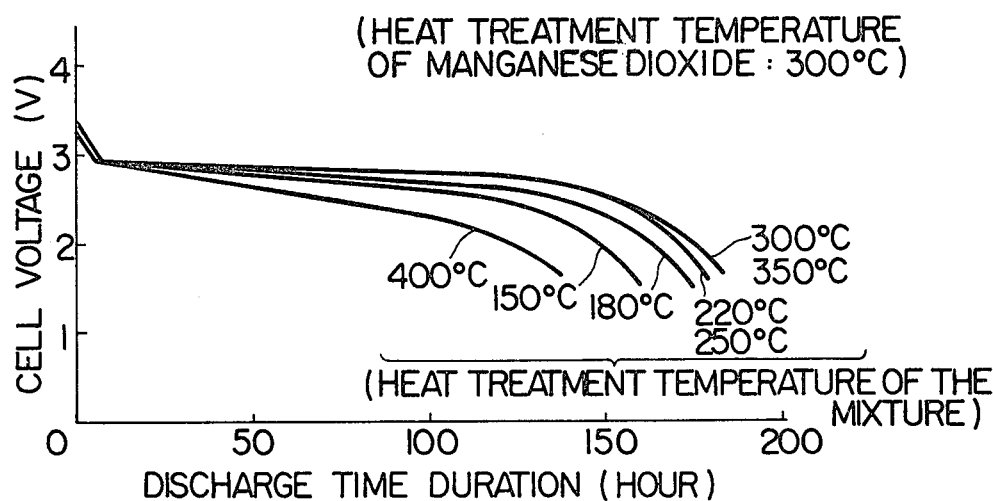
Figure 4:
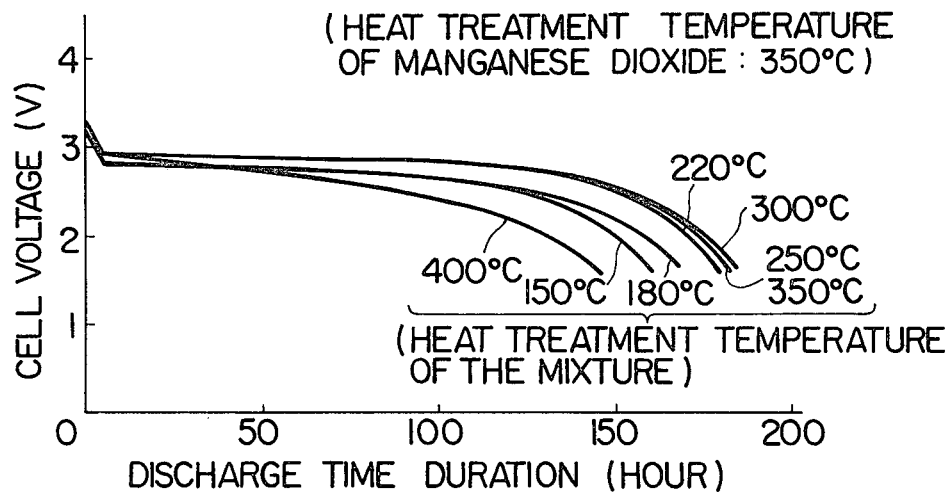
Figure 5:
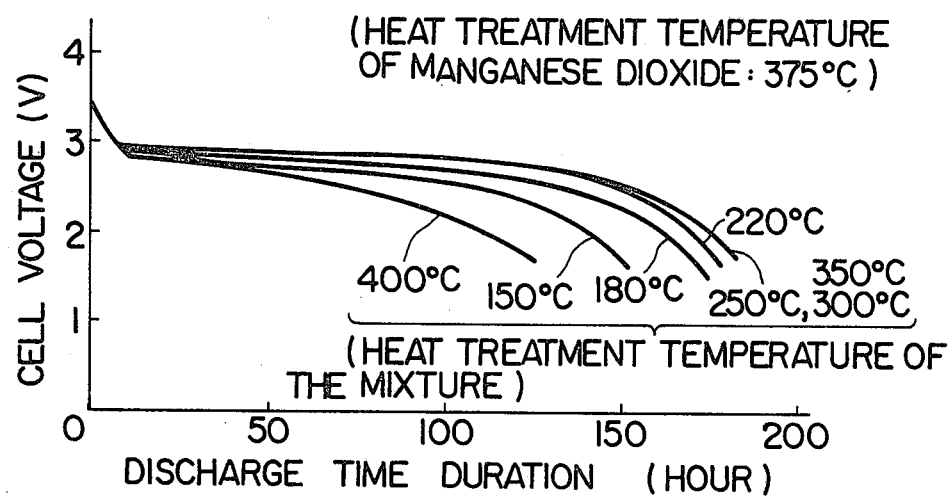
Figure 6:
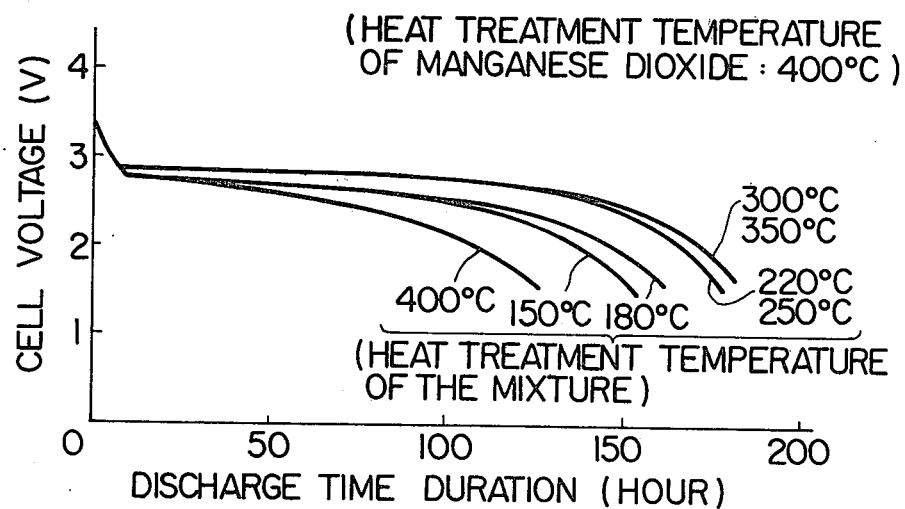
Figure 7:
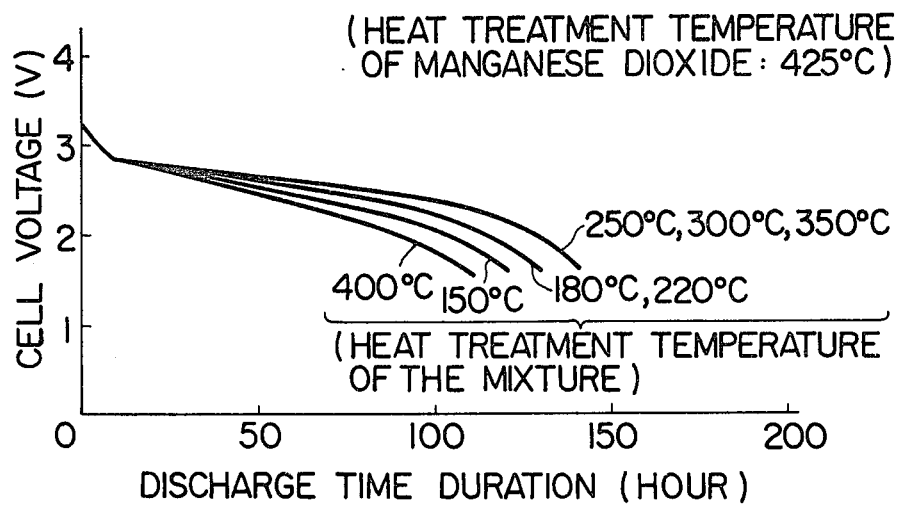
Figure 8:
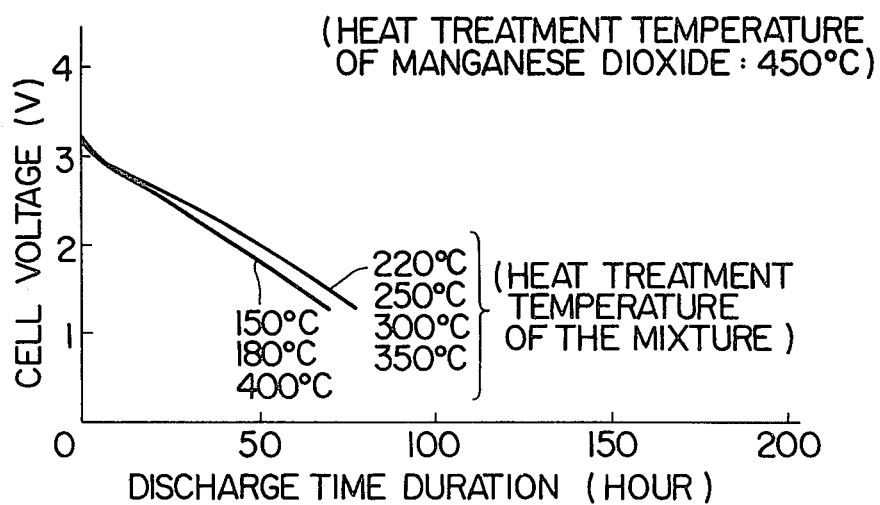

In detail, FIG. 1 shows the variation in cell voltage with the lapse of time, when discharged by connecting to a constant resistance of 3 kΩ, of the cells employing seven positive electrodes produced by heat-treating manganese dioxide at 200° C. followed by adding and mixing with the conducting agent and the binder, separately heat-treating fractions of the thus prepared mixture for the positive electrode respectively at 150° C., 180° C., 220° C., 250° C., 300° C., 350° C. and 400° C. and then molding while applying pressure.

Similarly, FIGS. 2 to 8 show the properties of the cells employing the positive electrodes produced by heat-treating manganese dioxide respectively at 250° C., 300° C., 350° C., 375° C., 400° C., 425° C. and 450° C. to obtain mixtures for the positive electrodes which were then heat-treated at the same temperture just mentioned above, followed by molding. In any of FIGS. 1 to 8, the ordinate represents the cell voltage in volts and the abscissa represents the discharge time duration in hours.

As will be understood from FIGS. 1 to 8, manganese dioxide is preferably heat-treated at 250°–400° C., particularly at 350°–375° C., and the mixture composed of manganese dioxide, the conductive agent and the binder be preferably heat-treated at 180°–350° C., particularly at 220°–300° C.

The critical temperature range described above is considered to be defined by the fact that combined water of manganese dioxide can not be satisfactorily removed to deteriorate the storage property if the heat treatment temperature of manganese dioxide is lower than 250° C., and by the fact that manganese dioxide ($MnO_2$) is decomposed into lesser active $Mn_2O_3$ to deteriorate the discharge property if the heat treatment temperature of manganese dioxide is higher than 400° C.

On the other hand, if the heat treatment temperature of the mixture is lower than 180° C., the dispersing agent added to disperse the binder is not sufficiently evaporated for removal, whereby the discharge property of the cell is deteriorated. On the contrary, if the heating temperature of the mixture is raised to higher than 350° C., the binder is apt to decompose, whereby difficulties are encountered in molding the positive electrode.

The results of the comparison tests conducted on the cell employing the positive electrode according to the present invention and on the cell employing the conventional positive electrode as has been mentioned in the introduction part of this specification will now be described.

According to the process for producing a positive electrode of the present invention, manganese dioxide employed as the active material for the positive electrode of a non-aqueous cell is heat-treated at a temperature of 300° C. for 3 hours in the first step. At this step, water contained in manganese dioxide is removed.

The thus heat-treated manganese dioxide is then added with acetylene black as the conducting agent and with fine powders of polytetrafluoroethylene as the binder, and these are mixed together. The fine powders (Particle Size: 0.05–0.5 micron) of the binder are used in the form of a suspension in water using a non-ionic surface active agent such as polyoxyethylene alkyiphenyl ether. The mixing ratio of manganese dioxide, actylene black and the polytetrafluoroethylene fine powder is 10:0.7:0.5 by weight.

The thus prepared mixture is then heat-treated at 270° C. for 20 minutes in order to evaporate and hence remove the contained non-ionic surface active agent and water.

The mixture after being heat-treated is pressed in a mold at a pressure of 3,000 kg/cm² in a dry atmosphere to be molded into a disc-shaped positive electrode having the dimensions of 15 mm in diameter and about 1 mm in thickness and having an electric capacity of 150 mAh.

A negative electrode forming the other electrode of a non-aqueous cell is produced in accordance with the conventional method using lithium as the active material for the negative electrode.

The non-aqueous electrolytic substance interposed between the negative electrode and the positive electrode produced in accordance with the present invention is composed of a polypropylene non-woven cloth impregnated with a non-aqueous organic electrolyte prepared by dissolving lithium perchlorate at a concentration of 1 mol/l in a mixed solvent of propylene carbonate and 1,2-dimethoxyethane.

Figure 9:
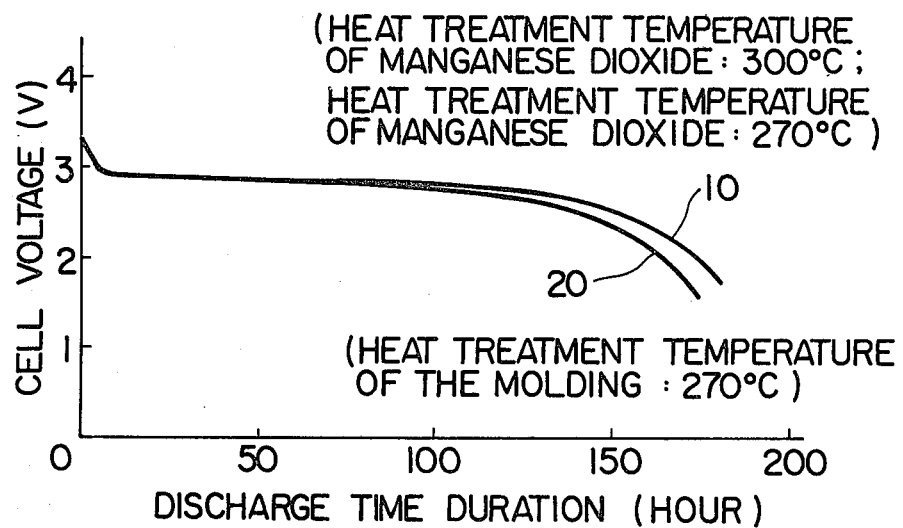
FIG. 9 is a graph showing, in comparison, the discharge property of the cell employing the positive electrode according to the present invention and that of the cell employing a positive electrode produced under the same conditions but through the conventional process.

FIG. 9 shows the discharge property of the cell thus produced, when discharged by connecting to a constant resistance of 3 kΩ, in comparison with a cell wherein a positive electrode produced by the conventional method of producing a positive electrode is employed. In FIG. 9, the ordinate represents the cell voltage in volts, and the abscissa represents the discharge time duration in hours. In this Figure, Curve 10 illustrates the discharge property of the cell wherein the positive electrode produced according to the invention is employed, and Curve 20 illustrates the discharge property of the cell wherein the positive electrode produced by the conventional process for producing the same is employed.

In connection with the aforementioned description, the positive electrode produced by the conventional process is made by the steps of heat-treating manganese dioxide at 300° C. for 3 hours, adding and mixing the manganese dioxide with acetylene black and a polytetrafluoroethylene powder, molding the thus obtained mixture by pressing at a pressure of 3,000 kg/cm², and then heat-treating the molded article at 270° C. for 20 minutes.

As will be understood from FIG. 9, the discharge property of the cell employing the positive electrode of the present invention is improved over that of the cell employing the positive electrode produced by the conventional process. For instance, when comparing them with respect to the utilization rate of manganese dioxide until the discharged voltage is lowered to 2 volts, the utilization rate reaches 97% in the cell employing the positive electrode of the present invention as shown by Curve 10, whereas that of the conventional cell is as low as 93% as shown by Curve 20.

This is because the positive electrode produced in accordance with the prior-art technique is heated after pressure molding so that the applied heat does not conduct sufficiently deep into the molded article. As a result, there is insufficient removal of water present internally of the molded body, such as adherent water adhering thereto at the step of adding and mixing manganese dioxide with the conducting agent and the binder and combined water originally contained in manganese dioxide. For this reason, deteriorations in discharge and storage properties can not be prevented.

In constrast thereto, in the production of the positive electrode according to the invention, since manganese dioxide is added with the conducting agent and the binder suspension and mixed together to obtain a mixture in the form of a suspension which is subjected to heating, the applied heat can be transmitted thoroughly so that it is possible to achieve adequate removal of not only adherent water adhering at the mixing step but also combined water originally contained in manganese dioxide. As a result, the discharge and storage properties can be improved as compared to the level attainable by the prior art technique.

Although in the embodiment referred to above a positive electrode is produced by the process wherein preliminarily heat-treated manganese dioxide is mixed with acetylene black and with a suspension prepared by dispersing fine powders of polytetrafluoroethylene having particle sizes of 0.05–0.5 micron in water by means of a non-ionic surface active agent, and the thus obtained mixture is heated to a temperature of 150° to 400° C. followed by pressure molding, the present invention is not limited only to such process but manganese dioxide may be mixed with the conducting agent and the binder without being subjected to preliminary heat treatment, and the resultant mixture may be heat-treated at a temperature within the range as defined hereinbefore.

Specifically in accordance with another embodiment of the invention, positive electrodes may be produced by the process comprising the steps of mixing manganese idoxide which has not been heat-treated with acetylene black and a suspension of polytetrafluoroethylene fine powders, heating the resultant mixture respectively at 150° C., 180° C., 220° C., 300° C., 350° C. and 400° C. for one hour, and then molding at a pressure of 3,000 kg/cm². In each case, the amount of manganese dioxide in the positive electrode is adjusted to that corresponding to an electric capacity of 150 mAh and the mixing ratio of manganese dioxide, acetylene black and polytetrafluoroethylene is adjusted to 10:0.7:0.5 by weight similarly as in the preceding embodiment.

Figure 10:
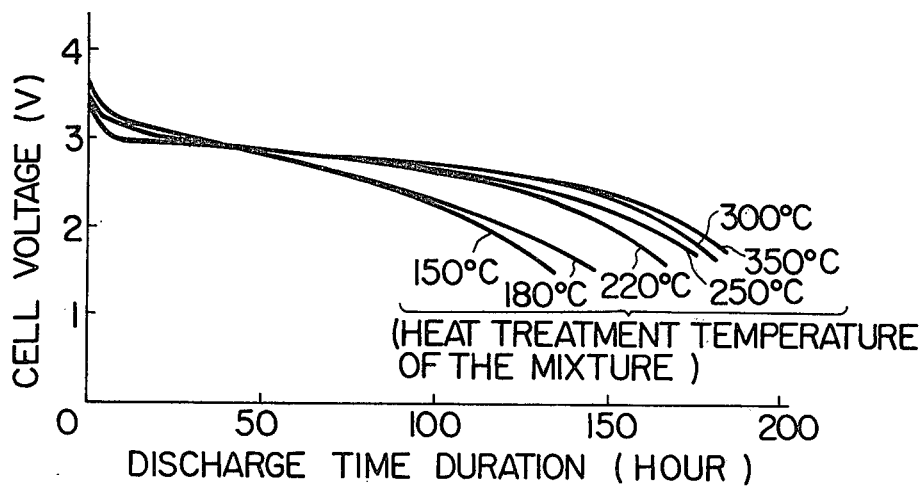
FIG. 10 is a graph showing the discharge property of a cell in terms of the heat treatment temperature wherein use is made of a mixture composed of manganese dioxide which has not been pre-heated, a conductive agent and a binder.

The discharge properties of the cells provided with the positive electrodes produced in accordance with the latter mentioned embodiment of the invention, when discharged by connecting to a constant resistance of 3 kΩ, are shown in FIG. 10. In FIG. 10, the ordinate represents the cell voltage in volts, and the abscissa represents the discharge time duration in hours.

As will be understood from FIG. 10, excellent discharge properties are exhibited when the mixture is heated at 220°–350° C., particularly at 300°–350° C. If the heating temperature is lower than the temperature range as defined above, such being the cases of heating at 150° C. and 180° C., adherent water and combined water adhered to and combined with manganese dioxide are not adequately removed, and hence result in considerable depression in discharged cell voltages. Although it is not shown in FIG. 10, the binder has been decomposed to lower the binding force considerably, making it difficult to mold the mixture into a molded article even if applied with an increased pressure in a case where the mixture is heat-treated at 400° C. For this reason, the discharge property datum with regard to this case could not be determined.

In accordance with this embodiment, the process can be further simplified since manganese dioxide is not necessarily subjected to any preliminary heat treatment.

Although acetylene black is used as the conducting agent in both of the embodiments set forth hereinabove, other powders of electrically conductive substances such as nickel, stainless steel, titanium, chromium, cobalt, gold, platinum, palladium, silver and copper may be used for this purpose.

Similarly, other than polytetrafluoroethylene referred to above, a copolymer of tetrafluoroethylene and hexafluoroethylene, polytrifluoromonochloroethylene, polyethylene, polypropylene, polystyrene, polyvinylalcohol or carboxymethyl cellulose may be used as the binder.

Dispersing agents, other than polyoxyethylene alkylphenyl ether, which may be used in the process of the invention include polyoxyethylene alkylamide, aliphatic amines, and polyoxy derivatives prepared by addition polymerization of any of alkyl phenols with ethylene oxide in the presence of an alkali catalyst.

As to the preferable dispersing or suspension medium other than water, organic solvents may be mentioned.

We claim:

1. A process for producing a positive electrode for a non-aqueous electrolytic cell comprising the steps of:
   (a) heat-treating manganese dioxide;
   (b) adding the thus heat-treated manganese dioxide with a conducting agent and a binder to be mixed together;
   (c) heat-treating the resultant mixture; and
   (d) molding the thus heat-treated mixture to form a positive electrode.

2. A process according to claim 1, wherein said binder is suspended in a dispersion medium by means of a dispersing agent.

3. A process according to claim 1 or 2, wherein said binder comprises fine powders of a fluorine-containing resin and said fine powders of said fluorine-containing resin are suspended in water or an organic solvent by means of a non-ionic surface active agent.

4. A process according to claim 1 or 2, wherein the heat treatment temperature of said manganese dioxide ranges from 250° to 400° C., preferably 350° to 375° C., and wherein the heat treatment temperature of said mixture ranges from 180° to 350° C., preferably 220° to 300° C.

5. A process for producing a positive electrode for a non-aqueous electrolytic cell comprising the steps of:
   (a) adding manganese dioxide with a conductive agent and a binder to be mixed together;
   (b) heat-treating the resultant mixture; and
   (c) molding the thus heat-treated mixture to form a positive electrode.

6. A process according to claim 5, wherein said binder is suspended in a dispersion medium by means of a dispersing agent.

7. A process according to claim 5 or 6, wherein said binder comprises fine powders of a fluorine-containing resin and said fine powders of said fluorine-containing resin are suspended in water or an organic solvent by menas of a non-ionic surface active agent.

8. A process according to claim 5 or 6, wherein the heat treatment temperature of said mixture ranges from 220° to 350° C., preferably 300° to 350° C.

9. A process for producing a positive electrode for a non-aqueous electrolytic cell comprising the steps of:
   (a) heating manganese dioxide at a temperature of 300° C. for 3 hours;
   (b) adding the thus heated manganese dioxide with acetylene black and a suspension of fine powders of polytetrafluoroethylene dispersed in water by a non-ionic surface active agent to be mixed together;
   (c) heating the resultant mixture at 270° C. for 20 minutes; and
   (d) molding the thus heated mixture at a pressure of 3,000 kg/cm$^2$ to form a positive electrode.

* * * * *